United States Patent [19]

Fukumoto

[11] Patent Number: 5,665,184
[45] Date of Patent: Sep. 9, 1997

[54] HEAVY DUTY PNEUMATIC TIRE

[75] Inventor: Tetsuhiro Fukumoto, Kobe, Japan

[73] Assignee: Sumitomo Rubber Industries, Ltd., Hyogo-ken, Japan

[21] Appl. No.: 532,104

[22] Filed: Sep. 22, 1995

[30] Foreign Application Priority Data

Sep. 28, 1994 [JP] Japan ................... 6-259550

[51] Int. Cl.$^6$ ................................................. B60C 11/12
[52] U.S. Cl. .......................... 152/209 R; 152/DIG. 3
[58] Field of Search ..................... 152/209 R, 209 D, 152/DIG. 3

[56] References Cited

U.S. PATENT DOCUMENTS

| | | | |
|---|---|---|---|
| 4,936,363 | 6/1990 | Schuster et al. | 152/209 R |
| 5,345,988 | 9/1994 | Kabe et al. | 152/209 R |
| 5,445,201 | 8/1995 | Kukimoto et al. | 152/DIG. 3 |
| 5,524,686 | 6/1996 | Takada et al. | 152/209 R |

FOREIGN PATENT DOCUMENTS

| | | | |
|---|---|---|---|
| 427417 | 5/1991 | European Pat. Off. | 152/209 R |
| 251205 | 11/1987 | Japan | 152/209 R |
| 114005 | 4/1990 | Japan | 152/209 R |
| 246213 | 9/1993 | Japan | 152/209 R |
| 80002 | 3/1994 | Japan | 152/209 D |

*Primary Examiner*—Steven D. Maki
*Attorney, Agent, or Firm*—Birch, Stewart, Kolasch & Birch, LLP

[57] ABSTRACT

A heavy duty pneumatic tire, in which uneven tread wear is controlled, has a tread portion provided with a pair of main circumferential grooves so as to divide the tread portion into a pair of shoulder lands between tread edges and the main circumferential grooves and an axially inner land between the main circumferential grooves, each main circumferential groove having a width of from 4 to 12% of the tread width TW, a narrow circumferential groove extending circumferentially of the tire along one of the main circumferential grooves so as to divide the axially inner land into an axially outer narrow land part and an axially inner major land part, the axial width W1 of the narrow land part being in the range of from 0.1 to 0.2 times the axial width W2 of the major land part, the narrow circumferential groove having a width of 0.5 to 2.5 mm and a depth of 50 to 90% of the depth of the main circumferential grooves, the narrow land part comprising circumferentially alternately arranged sunken parts and unsunken parts, the unsunken parts having the same height as the tread surface, and the sunken parts having a height lower than the tread surface but higher than the bottom of the narrow circumferential groove.

2 Claims, 5 Drawing Sheets

HEAVY DUTY PNEUMATIC TIRE

The present invention relates to a heavy duty pneumatic tire for trucks, buses and the like, more particularly a heavy duty pneumatic tire in which uneven tread wear is effectively controlled.

BACKGROUND OF THE INVENTION

In a heavy duty pneumatic tire for use in heavy duty cars such as truck and bus, a rib type tread pattern is usually due to its superior wear resistance. However, uneven wear, such that only a particular rib wears more rapidly than other ribs, occurs. As a result of the fact that a difference in the tire outer diameter between a tread crown portion and shoulder portions does not decrease when contacting with the ground, the tread rubber in the shoulder portion is dragged on the road surface during running, and so-called diameter difference wear is caused. This diameter difference wear expands in the tire axial direction, especially axially inwards, and a rib in the shoulder portion wears greatly in comparison with that in the tread crown portion. This type of wear is called shoulder wear.

To prevent such uneven wear, a technique shown in FIG. 7 has been proposed. According to this technique, a pneumatic tire having a rib type tread pattern is provided in its shoulder rib (a) with a narrow width groove (c) having a distance from a tread edge (b) which is specifically defined. The shoulder rib (a) is thus divided into an inner rib part (d) and an outer rib part (e). This is designed to sacrifice the outer rib part (e) with less rigidity for the above-explained diameter difference wear to thereby prevent the progress of uneven tread wear towards the inner rib part (d).

Further, another technique shown in FIG. 8 has been proposed, wherein a pneumatic tire having a pattern based on a rib type tread pattern is provided with a rib (f) which is located inside and next to the shoulder rib (a) and the rib (f) is provided in its axially outer edge portion with a narrow-width circumferentially-continuous groove (g). The rib (f) is thus divided into a main rib part (h) and a narrow rib part (i). This is designed to prevent uneven wear of the rib (f) which is the next to the shoulder rib by concentrating the wear on the narrow rib part (i).

Thus, the point of the above-mentioned two propositions is to concentrate wear on a narrow rib part which is formed by disposing a narrow width groove in a rib, wherein the narrow rib part is continuous in the tire circumferential direction and has substantially the same height as the tread surface (j) along the whole length thereof.

However, the narrow rib on which wear is to be concentrated, collapses greatly and is axially deformed and twisted in the ground contacting patch when the rib receives a sideforce from the road surface during cornering which is generally a strong force due to its shape. Those phenomena cause cracks starting from the bottom of the narrow groove and root part of the narrow rib, and tearing off such that the narrow rib is cut into small blocks and some of them drop out.

Thus, there is a problem that wear can not be concentrated on the narrow rib and the rib can not display the wear preventing function, contrary the expectation.

SUMMARY OF THE INVENTION

It is therefore, an object of the present invention to provide a heavy duty pneumatic tire in which the above-mentioned problems are solved to effectively control the axially inward extension of uneven wear.

According to one aspect of the present invention, a heavy duty pneumatic tire comprises a tread portion with a pair of tread edges, the tread portion having a tread surface, a pair of main circumferential grooves disposed in the tread portion so as to divide the tread portion into a pair of shoulder lands between the tread edges and the main circumferential grooves, and an axially inner land between the main circumferential grooves, each of the main circumferential grooves extending circumferentially of the tire and having a width of from 4 to 12% of the ground contacting width TW of the tread portion, a narrow circumferential groove disposed in the axially inner land and extending circumferentially of the tire along one of the main circumferential grooves so as to divide the axially inner land into an axially outer narrow land part and an axially inner major land part so that the axial width W1 of the narrow land part is in the range of from 0.1 to 0.2 times the axial width W2 of the major land part, the narrow circumferential groove having a width of 0.5 to 2.5 mm, and a depth of 50 to 90% of the depth of the main circumferential grooves, and the narrow land part comprising circumferentially alternately arranged sunken parts and unsunken parts, the unsunken parts having the same height as the tread surface, the sunken parts having a height lower than the tread surface but higher than the bottom of the narrow circumferential groove.

Therefore, during running, the unsunken parts contact with the ground, and wear is concentrated thereon. On the other hand, the sunken parts do not contact with the ground, and the rigidity thereof increases, thereby preventing the occurence of cracks and rubber tearing-off. Accordingly, the narrow land part as a whole can be improved in the resistance to rubber tearing-off; the effect of concentrating wear thereon is enhanced; and the progress of uneven wear to the major land part can be controlled.

BRIEF DESCRIPTION OF THE DRAWINGS

Embodiments of the present invention will now be described in detail according to the accompanying drawings.

DETAILED DESCRIPTION OF THE INVENTIONS

Figure 1:
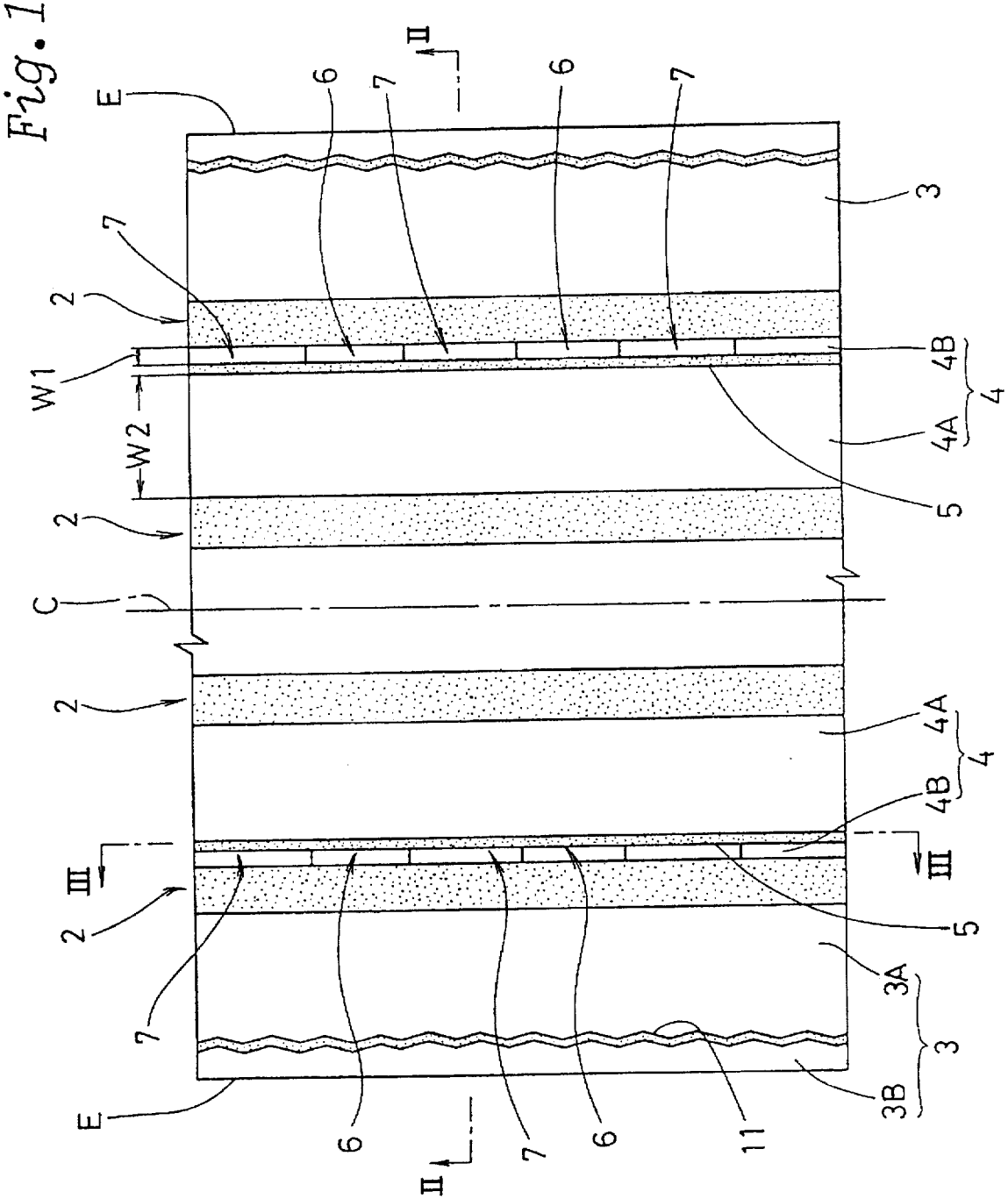
FIG. 1 is a developed plan view of a tire according to the present invention showing an example of the tread pattern.
Figure 2:
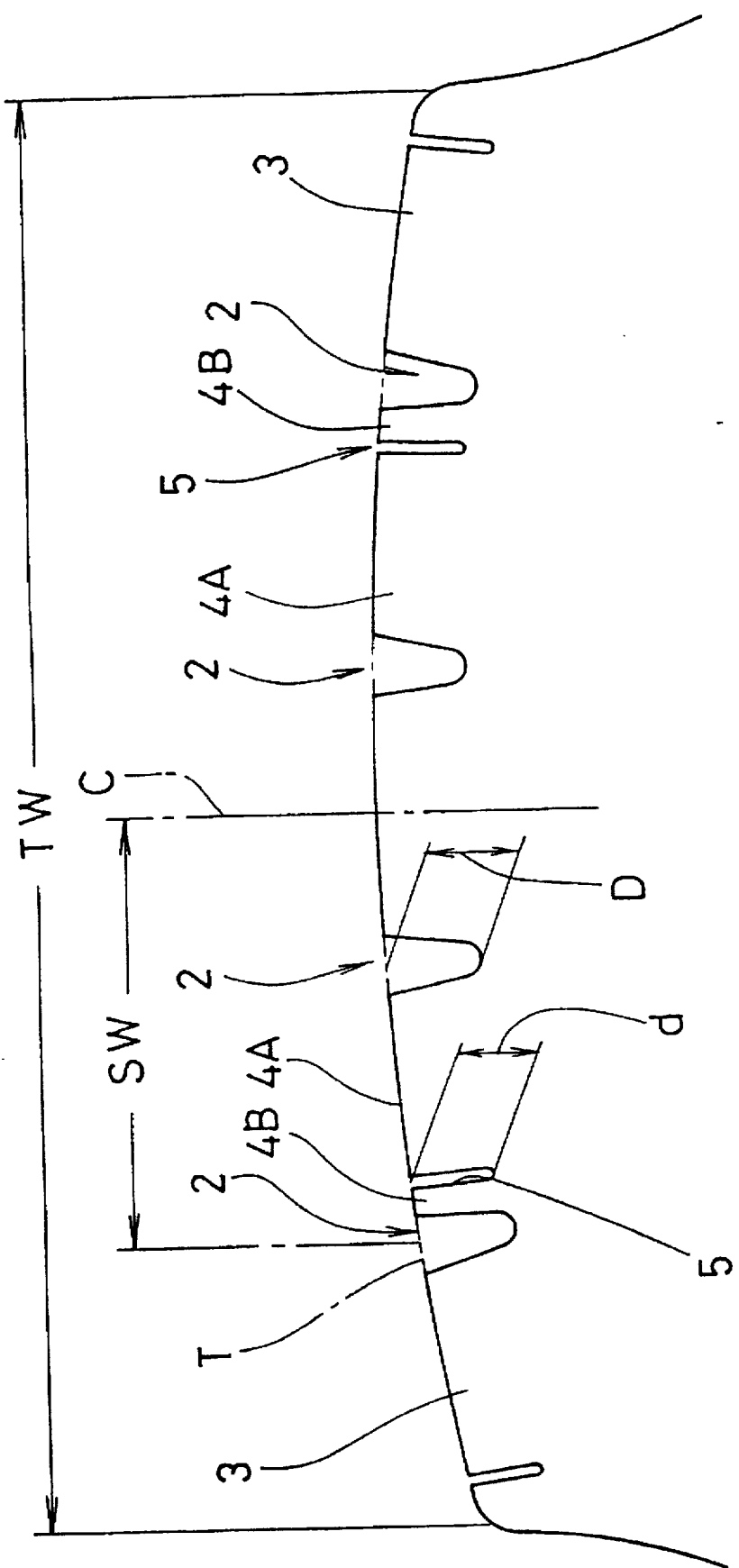
FIG. 2 is a cross sectional view of the tread portion thereof taken along the line II—II of FIG. 1

In FIGS. 1–5, the heavy duty pneumatic tire according to the invention is formed as a truck/bus radial tire.

The pneumatic tire comprises a tread portion, a pair of axially spaced bead portions, and a pair of sidewall portions extending between the tread edges E and the bead portions, a bead core disposed in each of the bead portions, a carcass extending between the bead portions, and a belt disposed radially outside the carcass and inside a rubber tread.

The tread portion is provided with at least two main circumferential grooves 2 extending in the tire circumferential direction, so as to divide the tread portion into a pair of shoulder lands 3 and at least one axially inner land 4 therebetween.

Each of the shoulder lands 3 is defined between one of tread edges E and one of the main circumferential grooves 2 adjacent to the tread edge E.

The axially inner land 4 is defined between the above-mentioned main circumferential groove 2 and another main circumferential groove 2 adjacent thereto, whereby the axially inner land 4 is disposed adjacent to the shoulder land 3.

Figure 4:
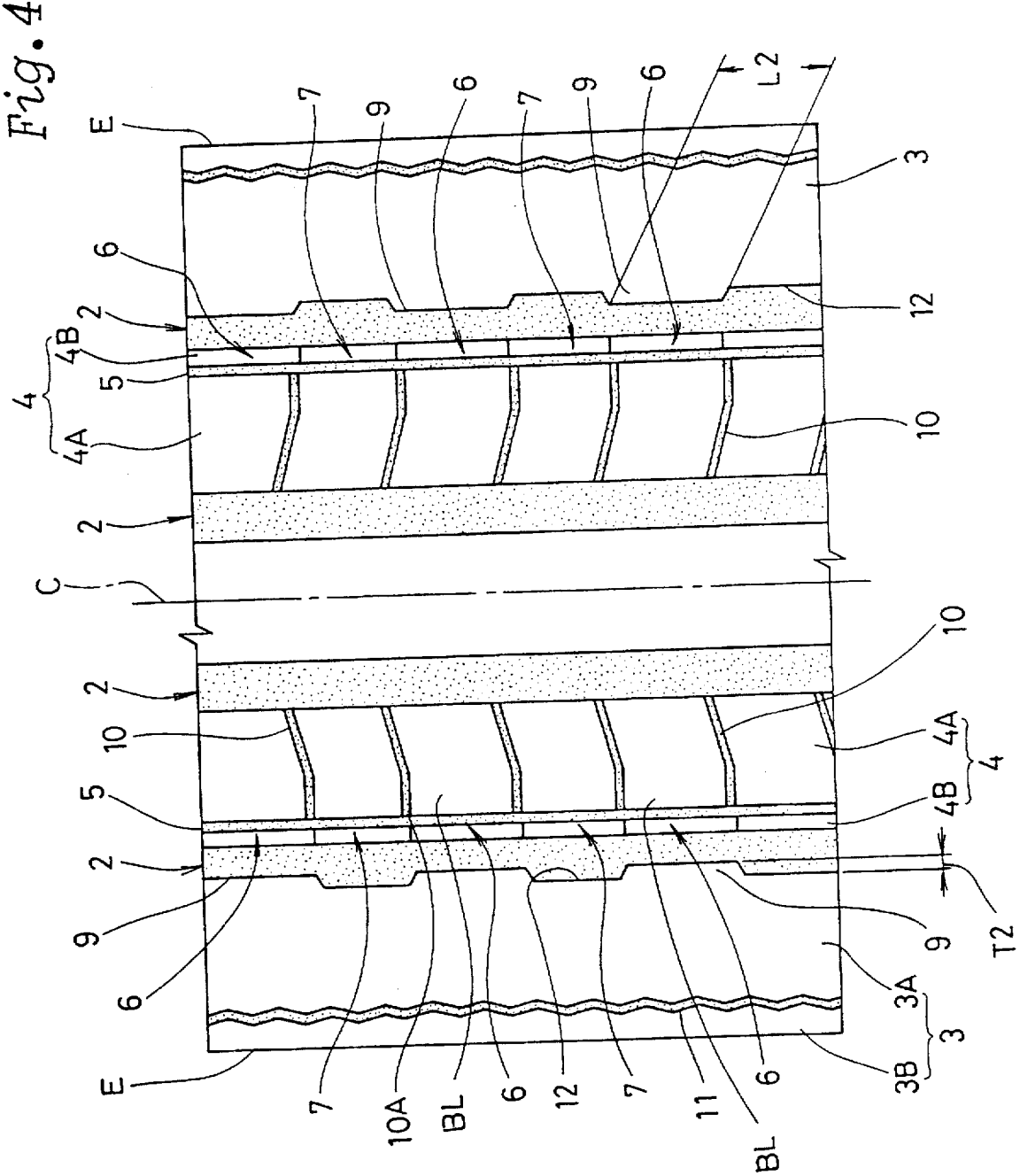
FIG. 4 is a developed plan view of a tire according to the present invention showing another example of the tread pattern.

The embodiments shown in FIGS. 1 and 4 are provided with four main circumferential grooves 2, two axially outer grooves and two axially inner grooves. Accordingly, the tread portion is divided into five land parts: two shoulder lands 3 between the tread edges and the axially outer grooves 2, two axially inner land parts 4 between the axially outer grooves 2 and the axially inner grooves 2, and one central land part between the axially inner grooves 2. Thus, the tread patterns in the embodiments are based on a five rib pattern.

The main circumferential grooves 2 are generally straight, but a zigzag groove may be used.

The main circumferential grooves 2 have a width of from 4% to 12%, preferably 5% to 7%, of the ground contacting width TW under a standard condition. Here, the standard condition is such that the tire is mounted on a standard rim, inflated to a standard pressure and loaded with a maximum load.

The main circumferential grooves 2 have a depth D of not less than 12 mm.

If TW=216 mm, the width of the main circumferential grooves 2 is about 8.6 to 26 mm, preferably 12 to 15 mm. In the embodiments, the depth D is not less than 14.6 mm.

Preferably, the distance SW from the tire equator C to the center line of the axially outermost main circumferential grooves 2 is set in the range of from 45 to 75% of a half ground contacting width TW/2, that is, 22.5 to 37.5% of TW.

If the distance SW exceeds 75% of TW/2, the shoulder lands 3 decreases in rigidity to deteriorate the steering performance, and uneven wear is liable to occur since the ground pressure distribution of the tread becomes uneven. If under 45%, the ground pressure distribution of the axially inner lands 4 becomes substantially even, which cause less uneven wear, thus, it is not necessary to prevent the uneven wear.

According to the present invention, the inner land 4 adjacent to each shoulder land 3 is provided with a narrow circumferential groove 5.

The narrow groove 5 extends continuously in the tire circumferential direction so as to subdivide this inner land 4 into an axially inner wide land part 4A and an axially outer narrow land part 4B.

It is preferable that the narrow circumferential groove 5 extends parallel with the axial inner edge of the axially outermost main circumferential groove 2. In the embodiments, therefore, the narrow circumferential groove 5 is a straight groove. However, if the axially outermost main circumferential groove 2 is a zigzag groove, the narrow circumferential groove 5 is preferably a zigzag groove.

The narrow circumferential groove 5 has a width of from 0.5 to 2.5 mm, and a depth (d) of from 50 to 90%, more preferably 50 to 80% of the depth D of the main circumferential grooves 2. In the embodiments, the width is 2.0 mm, and the depth is 13.0 mm. If the width is less than 0.5 mm, it becomes difficult to make the tire vulcanizing mold. If the width exceeds 2.5 mm, as the distance between the major land part 4A and the narrow land part 4B is large, axial deformation of the narrow land part 4B becomes large which results in tearing-off of the rubber, and it becomes difficult to concentrate wear energy on the surface of the narrow land part 4B.

The reason for limiting the depth (d) of the narrow circumferential groove 5 relatively to the depth D of the main circumferential grooves 2 is as follows. If the depth (d) is under 50% of the depth D, the rigidity of the narrow land part 4B is excessively high, and the rigidity difference from the major land part 4A is small. Thus, it is difficult to concentrate wear on the narrow land part 4B. If the depth (d) exceeds 90% of the groove depth D, it is necessary to increase the tread rubber thickness, and as a result, heat generation therefrom and the tire weight increase. Further, rubber tearing-off of the narrow land part 4B is liable to occur.

The axial width W1 of the narrow land part 4B is in the range of from 0.1 to 0.2 times the axial width W2 of the major land part 4A.

The narrow land part 4B is for concentrating the tread wear thereon. If the width W1 is less than 0.1 times the width W2, as the narrow land part 4B is greatly decreased in the rigidity and easily collapses in the axial direction of the tire, wear can not be concentrated thereon and shifts to other land parts, causing uneven wear. If the width W1 exceeds 0.2 times the width W2, as the rigidity of the narrow part 4B becomes excessively high and the rigidity difference from the major land part 4A becomes small, wear can not be concentrated.

Preferably, the width W1 of the narrow land part 4B is about 2 to 6 mm.

Figure 3:
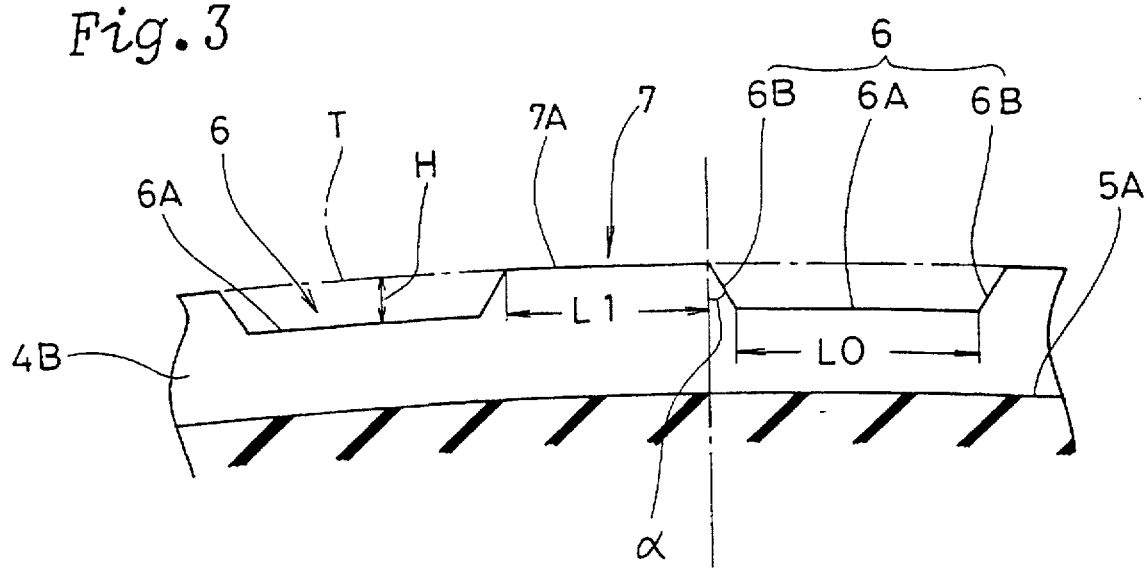
FIG. 3 is a cross sectional view taken along the line II—II of FIG. 1

The narrow land part 4B is periodically sunken as shown in FIG. 3. Thus, the narrow land part 4B consists of sunken parts 6 and unsunken parts 7 which are disposed alternately in the tire circumferential direction.

Each of the unsunken parts 7 has a top surface 7A having the same height as the tread surface T.

The height of the sunken parts 6 is between the tread surface T and the groove bottom 5A of the narrow groove 5.

In this embodiments, each of the sunken parts 6 has a radially innermost face 6A and a pair of inclined faces 6B. Each of the inclined faces 6B extending from one of the circumferential ends of the radially innermost face 6A to the adjacent circumferential end of the top face 7A of the adjacent unsunken part 7. As shown in FIG. 3, the inclined faces 6B are inclined at an angle alpha such that the sunken part has a cross sectional shape like a reversed trapezoidal shape.

Preferably, the inclination angle alpha is in the range of from 30 to 60 degrees. If the inclination angle alpha is less than 30 degrees, cracks are liable to occur at the corners between the inclined faces 6B and the radially innermost face 6A. If the angle exceeds 60 degrees, the circumferential length of the inclined faces increases, and it is difficult to control the ground pressure in the major land part 4A axially adjacent to the inclined faces.

The ratio (L0/L) of the circumferential length L0 of the radially innermost face 6A to the ground contacting length L is preferably 0.05 to 0.20. If the ratio (L0/L) is under 0.05, the length of the unsunken parts 7 increases, and as a result the rigidity of the narrow land part 4B can not be increased, and cracks and rubber tearing-off are liable to occur. If the ratio (L0/L) exceeds 0.20, the rigidity of the narrow land part 4B is increased, but it becomes difficult to control uneven wear in the major land part 4A since the length of the unsunken parts 7 is liable to be insufficient for concentrating the wear energy.

Here, the ground contacting length L is the maximum circumferential length of the foot print under the above-mentioned standard condition. For example, if the ground contacting length L is 245 mm, the length L0 of the radially innermost face 6A is about 12 to 50 mm.

Further, the ratio (L0/L1) of the length L0 of the radially innermost face 6A of the sunken part 6 to the circumferential length L1 of the top surface 7A of the unsunken part 7 is preferably in the range of from more than 0.5 to less than 1.5. If the ratio (L0/L1) is not more than 0.5, cracks and rubber tearing-off are liable to occur in the bottom 5A of the narrow circumferential groove 5 and the under part of the narrow land part 4A. If the ratio is not less than 1.5, it becomes difficult to control uneven wear in the major land part 4A.

Furthermore, the depth H of the sunken parts measured from the tread surface T to the radially innermost face 6A is such that the sunken parts receive no reaction from the road surface against tire load during running. In other words, the sunken parts substantially do not contact with the road surface. In practice, the depth H is preferably in the range of from 2 to 4 mm. If the depth H is less than 2 mm, the radially innermost faces of the sunken parts are liable to contact with the road surface, and the sunken parts 6 can not maintain their rigidity. Therefore, it is difficult to prevent cracks and rubber tearing-off. If the depth H exceeds 4 mm, the major land part 4A wears unevenly in a part axially adjacent to the sunken part 6. Further, when the depth decreases to about 2 mm due to tread wear, the major land part 4A is liable to wear unevenly.

When the unsunken parts 7 are worn such that the narrow land part 4B as a whole is a substantially constant height, as the rigidity of the narrow land part 4B increases, it does not suffer from the rubber tearing-off any more. Thus, the present invention plays an important part in the initial stage of the tread wear life.

The above-mentioned shoulder lands 3 in the embodiments are similarly subdivided into an axially inner rib part 3A with higher rigidity and an axially outer rib part 3B with lower rigidity by disposing a secondary groove 11 therebetween. The secondary groove 11 has a width narrower than the main circumferential grooves 2. In this example, a zigzag or wavy groove 11 having a width of 0.5 to 2.5 mm is used. The secondary groove 11 is disposed such that the distance from the tread edge E to the groove center line is 18 to 23% of the overall width of the shoulder lands 3. In the shoulder lands 3, accordingly, wear is concentrated on the outer rib part 3B, thereby preventing the axially inward extension of uneven wear to the inner rib part 3A.

In the embodiment shown in FIG. 1, the major land part 4A is provided with no groove. Accordingly, the major land part 4A is a rib which extends continuously in the tire circumferential direction, and the width W2 is constant along its length.

Figure 5:
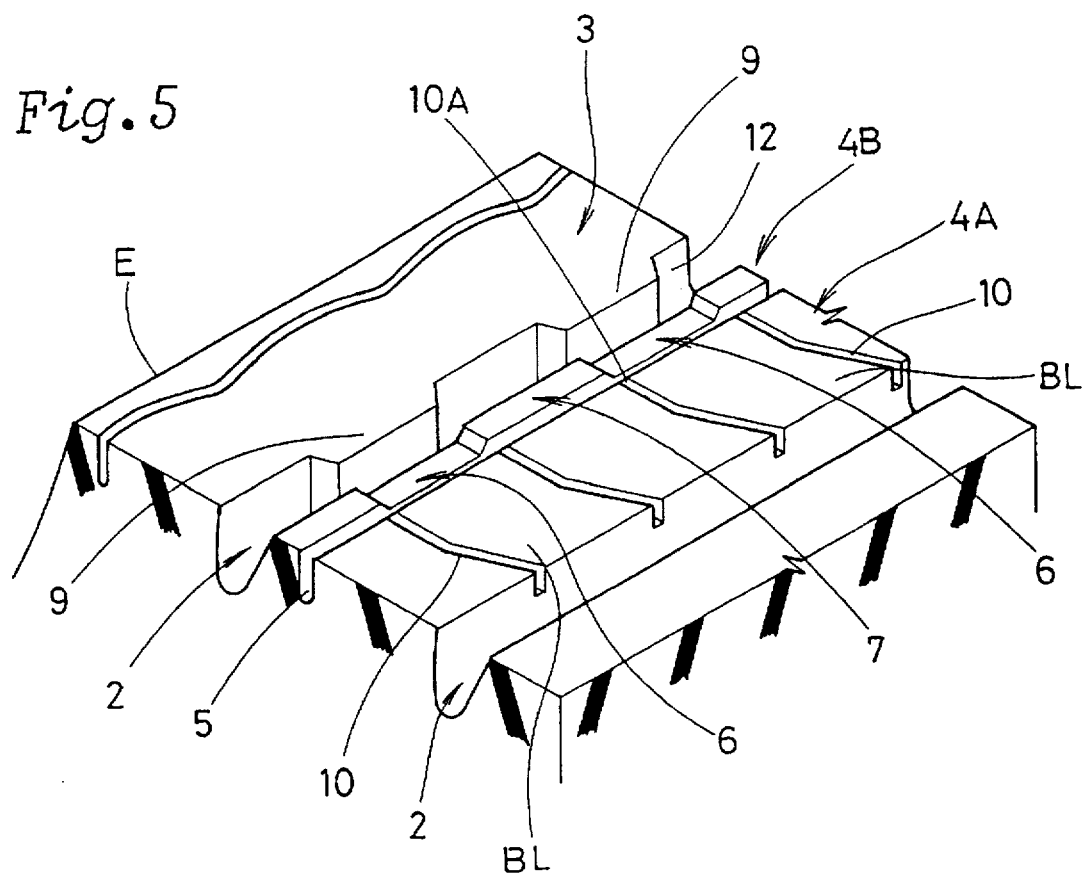
FIG. 5 is a partial perspective view of the tread portion thereof.

In the embodiment shown in FIGS. 4 and 5, the major land part 4A is provided with axial sipes or narrow grooves 10 extending across the whole width of the major land part 4A. The depth of the sipes 10 is preferably in the range of 2 to 4 mm, more preferably the same as the depth H of the sunken parts 6. In this example, the depth is 3 mm, and the width is 2 mm. Accordingly, the land 4A is circumferentially subdivided and formed as a row of blocks. Therefore, the drainage and traction force are improved.

The sipes 10 can be arranged at regular or irregular intervals in the tire circumferential direction, but preferably, the axially outer ends 10A of the sipes 10 are disposed at substantially the same circumferential positions as the boundary lines between the sunken parts 6 and the unsunken parts 7, which allows the blocks BL which are axially adjacent to the sunken parts 6 and thereby being liable to be subjected to a side force, to bend elastically and shows an effect of controlling uneven wear. However, it may be possible to dispose the ends 10A at different circumferential positions from those of the boundary lines.

The reason why the depth of the sipes 10 is preferably the same as the depth H of the sunken parts 6, is that, when the tread wear progresses and as a result the narrow land part 4B as whole has the same height, it becomes unnecessary to allow the easy elastic bending of the block BL by the sipes 10.

Further, in the embodiment shown in FIGS. 4 and 5, the axially inner sidewall 12 of each of the shoulder lands 3 is provided with alternately arranged protruding parts 9 and recesses with the protruding parts 9 protruding into the adjacent main groove 2, that is one of the axially outermost main circumferential grooves 2.

The protruding parts 9 are disposed at the same circumferential positions as the sunken parts 6 and have the same height as the tread surface T.

According to the invention, the sunken parts 6 are provided as explained above. As a result, the ground contacting area decreases, and especially the ground pressure of the major land part 4A is liable to increase in the portions adjacent to the sunken parts 6. However, by providing the protruding parts 9, the ground contacting area is increased to compensate the above-mentioned decrease, and the above-mentioned increase in the ground pressure can be canceled.

Therefore, the amount T2 of protrusion of each protruding part 9 is determined based on the width W1 of the narrow land part 4B, and preferably the difference (W1−T2) is set in the range of from 0 to 3.0 mm. If the difference (W1−T2) exceeds 3.0 mm, it is difficult to even the ground pressure of the major land part 4A to control uneven wear. If the difference (W1−T2)<0, the effect of controlling uneven wear can not be improved any more; water flow in the main groove is hindered; and the wet performance is decreased.

Preferably, the circumferential length L2 of the protruding part 9 measured at the axially inner end thereof is the same as the circumferential length L0 of the radially innermost face 6A of the sunken part.

In the above-mentioned embodiments, the contour T of the tread portion is defined by a single radius curvature at least between the secondary grooves 11. In relation to this, if a difference in height between the unsunken parts 7 and the contour T is less than about 1 mm, such a small difference may be disregarded. In other words, the above-mentioned "same height" as the tread surface may include such fluctuations.

Test tires, including Example tires 1 to 8 according to the present invention having the tread patterns shown in FIG. 1 and FIG. 4 in which the sunken parts 6 of the narrow land part 4B are changed, and a prior art tire having the same tread pattern as FIG. 1 excepting that the narrow land part 4B has a constant height same as the tread surface, were made and tested for uneven wear, rubber tearing-off, and crack.

1) Uneven wear test

Figure 6:
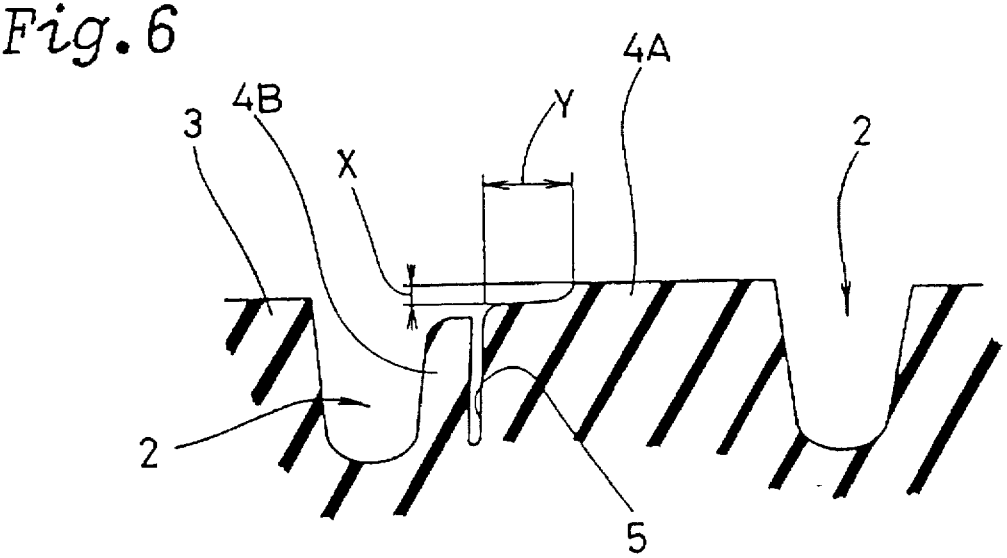
FIG. 6 is a cross sectional view for explaining the uneven wear of the major land part.
Figure 7:
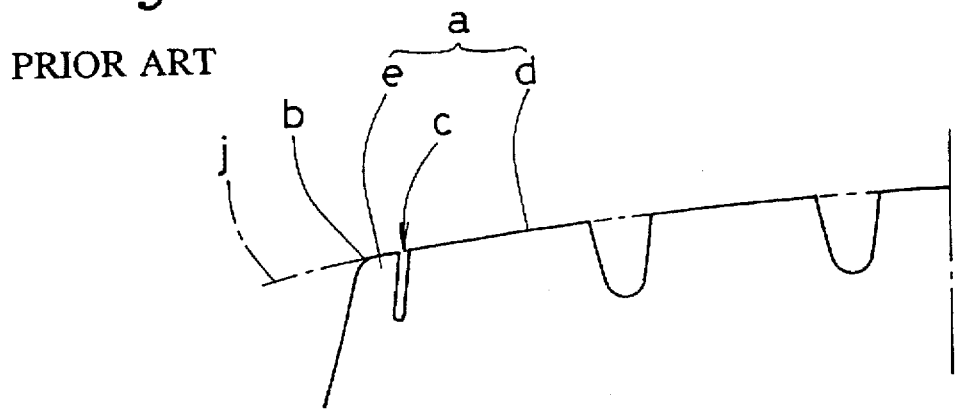
FIGS. 7 and 8 are schematic cross sectional views for explaining the prior art.
Figure 8:
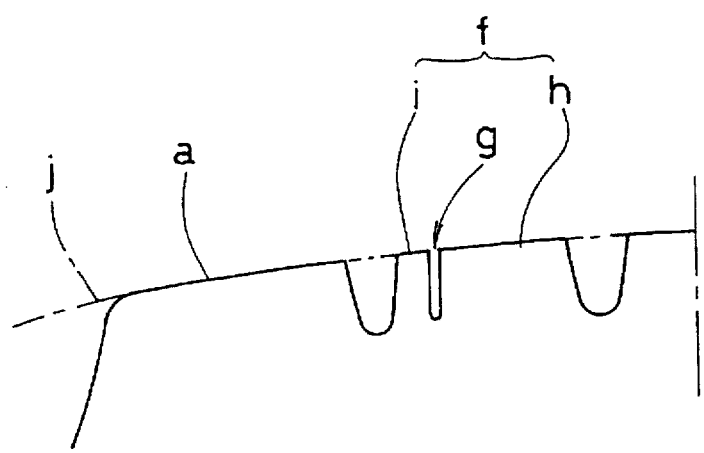

After running for 80,000 miles a test car (2-DD tractor) of which the front wheels were provided with test tires, uneven wear of the major land parts was measured in every one sixteenth circumferential part of the tire. As shown in FIG. 6, the depth X and width Y of the wear of the major land part 4A were measured in each one sixteenth part, and the depth X multiplied by the width Y was calculated, then the mean value thereof was calculated as the uneven wear of the tire. In Table 1, the uneven wear is indicated by an index based on that the prior art tire is 100. The smaller value is better.

2) Rubber tearing-off test

After running for 10,000 miles in the above-mentioned uneven wear test, an inspection of the narrow land parts was made, and the number of portions in which rubber tearing-off was occurred was counted.

3) Crack test

After the 80,000 mile running, an inspection of the narrow circumferential grooves was made, and the number of cracks extending from the groove bottom was counted.

The test results on the tire size 285/75R24.5 are summarized in Table 1. The rim size was 8.25×24.5, and the tire inner pressure was 100Pa(SI).

stage of the tread wear life, and the uneven wear of the axially inner land part adjacent to the shoulder land is effectively prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A heavy duty pneumatic tire comprising a tread portion with a pair of tread edges, the tread portion having a tread surface, a pair of main circumferential grooves disposed in said tread portion so as to divide the tread portion into a pair of shoulder lands between the tread edges and the main circumferential grooves, and an axially inner land between the main circumferential grooves, each said main circumferential groove extending circumferentially of the tire and having a width of from 4 to 12% of the ground contact width TW of the tread portion, a narrow circumferential groove disposed in the axially inner land and extending circumferentially of the tire along one of the main circumferential grooves so as to divide the axially inner land into an axially outer

TABLE 1

| Tire<br>Tread pattern | Prior<br>*1 | Ex.1<br>FIG.1 | Ex.2<br>FIG.1 | Ex.3<br>FIG.1 | Ex.4<br>FIG.1 | Ex.5<br>FIG.1 | Ex.6<br>*2 | Ex.7<br>FIG.4 | Ex.8<br>*3 | Ex.9<br>FIG.4 | Ex.10<br>FIG.4 | Ex.11<br>FIG.4 |
|---|---|---|---|---|---|---|---|---|---|---|---|---|
| Length L (mm) | 245 | 245 | 245 | 245 | 245 | 245 | 245 | 245 | 245 | 245 | 245 | 245 |
| Length L0 (mm) | | 21 | 21 | 21 | 21 | 21 | 21 | 21 | 21 | 21 | 21 | 21 |
| Length L1 (mm) | | 24 | 24 | 24 | 24 | 24 | 24 | 24 | 24 | 24 | 24 | 24 |
| Depth H (mm) | | 1 | 2 | 3 | 4 | 5 | 3 | 3 | 3 | 3 | 3 | 3 |
| Length L2 (mm) | | | | | | | 22 | 22 | | 22 | 22 | 22 |
| Protrusion T2 (mm) | | | | | | | 2 | 2 | | 1 | 3 | 4 |
| L0/L | | 0.09 | 0.09 | 0.09 | 0.09 | 0.09 | 0.09 | 0.09 | 0.09 | 0.09 | 0.09 | 0.09 |
| L1/L0 | | 1.15 | 1.15 | 1.15 | 1.15 | 1.15 | 1.15 | 1.15 | 1.15 | 1.15 | 1.15 | 1.15 |
| L2/L0 | | | | | | | 1.04 | 1.04 | | 1.03 | 1.04 | 1.04 |
| Angle alpha (deg) | | 45 | 45 | 45 | 45 | 45 | 45 | 45 | 45 | 45 | 45 | 45 |
| W1-T2 (mm) | | | | | | | | 2 | | 3 | 1 | 0 |
| Test results | | | | | | | | | | | | |
| Uneven wear | 100 | 100 | 98 | 98 | 97 | 85 | 100 | 96 | 97 | 97 | 96 | 96 |
| Tearing-off | 13 | 10 | 3 | 2 | 0 | 1 | 0 | 0 | 0 | 0 | 0 | 0 |
| Crack | 2 | 0 | 0 | 0 | 0 | 0 | 0 | 0 | 0 | 0 | 0 | 0 |
| Other common data | | | | | | | | | | | | |
| Tread Width TW | 216 mm | | | | | | | | | | | |
| Distance SW | 65 mm | | | | | | | | | | | |
| Narrow land part width W1 | 4 mm | | | | | | | | | | | |
| Major land part width W2 | 28 mm | | | | | | | | | | | |
| Outer main groove width | 9 mm | | | | | | | | | | | |
| Inner main groove width | 11.5 mm | | | | | | | | | | | |
| Center rib width | 30 mm | | | | | | | | | | | |

*1: The same pattern as FIG. 1 except for that the narrow land parts having the same height as the tread surface along the length thereof.
*2: The same pattern as FIG. 4 excepting that the sipes are omitted.
*3: The same pattern as FIG. 4 excepting that the protruding parts are omitted.

It was confirmed from the tests that, in comparison with the prior art tire, uneven wear of the major land parts 4B of each example tire was well controlled to show even wear. Further, the rubber tearing-off of the narrow land parts and the cracks in the narrow circumferential groove bottom were also well controlled.

As described above, in the heavy duty pneumatic tire according to the present invention, the occurrence of cracks and rubber tearing-off on the narrow land part on which wear is to be concentrated is prevented especially in the initial narrow land part and an axially inner major land part so that the axial width W1 of the narrow land part is in the range of from 0.1 to 0.2 times the axial width W2 of the major land part, the narrow circumferential groove having a width of 0.5 to 2.5 mm, and a depth of 50 to 90% of the depth of the main circumferential grooves, the narrow land part comprising circumferentially alternately arranged sunken parts and unsunken parts, the unsunken parts having the same height as the tread surface, and the sunken parts having a height lower than the tread surface but higher than the bottom of the narrow circumferential groove-, wherein the shoulder land adjacent to said one of the main circumferential grooves is provided with protrusions and recesses, each protrusion protruding into the main circumferential groove and having a circumferential length, the protrusions and recesses alternately arranged such that the circumferential position of each protrusion corresponds to the circumferential position of one of the sunken parts and the circumferential position of each recess corresponds to the circumferential position of one of the unsunken parts, and the protrusions have the same height as the tread surface.

2. The heavy duty pneumatic tire according to claim 1, wherein the major land part is provided with sipes extending across the whole width of the major land part.

* * * * *